US008550126B2

(12) United States Patent
Kuo et al.

(10) Patent No.: US 8,550,126 B2
(45) Date of Patent: Oct. 8, 2013

(54) AUTOMATIC ACID FILLING APPARATUS

(76) Inventors: Lung Kuo, Taipei (TW); Chia-Shou Kuo, Taipei (TW)

( * ) Notice: Subject to any disclaimer, the term of this patent is extended or adjusted under 35 U.S.C. 154(b) by 474 days.

(21) Appl. No.: 12/984,084

(22) Filed: Jan. 4, 2011

(65) Prior Publication Data

US 2011/0290373 A1 Dec. 1, 2011

(30) Foreign Application Priority Data

May 27, 2010 (TW) .............................. 99210046 U

(51) Int. Cl.
*H01M 2/36* (2006.01)
*B65B 31/04* (2006.01)

(52) U.S. Cl.
USPC ................. 141/32; 141/1.1; 141/65

(58) Field of Classification Search
USPC ........................ 141/1.1, 32–33, 65
See application file for complete search history.

(56) References Cited

U.S. PATENT DOCUMENTS

| | | | | | |
|---|---|---|---|---|---|
| 2,063,417 | A | * | 12/1936 | Wheat | 141/116 |
| 2,578,024 | A | * | 12/1951 | Link et al. | 53/432 |
| 2,810,776 | A | * | 10/1957 | Solomon et al. | 429/52 |
| 2,899,481 | A | * | 8/1959 | Kardorff | 137/124 |
| 3,078,883 | A | * | 2/1963 | Beall, Jr. | 141/198 |
| 3,534,785 | A | * | 10/1970 | Bensen | 141/41 |
| 3,786,842 | A | * | 1/1974 | Rinnert | 141/1 |
| 3,931,840 | A | * | 1/1976 | Rinnert | 141/1.1 |
| 3,934,624 | A | * | 1/1976 | Eberle | 141/100 |
| 3,999,581 | A | * | 12/1976 | Eberle | 141/1 |
| 4,010,780 | A | * | 3/1977 | Eberle | 141/168 |
| 4,565,750 | A | * | 1/1986 | Isoi et al. | 429/72 |
| 4,588,662 | A | * | 5/1986 | McManis et al. | 429/52 |
| 4,980,249 | A | * | 12/1990 | Isoi et al. | 429/122 |
| 5,002,100 | A | * | 3/1991 | Frederick | 141/35 |
| 5,171,647 | A | * | 12/1992 | Dean et al. | 429/54 |
| 5,738,690 | A | * | 4/1998 | Hughett et al. | 29/623.1 |
| 6,053,221 | A | * | 4/2000 | Eberle et al. | 141/179 |
| 6,588,460 | B1 | * | 7/2003 | Wipperfurth et al. | 141/59 |
| 6,588,461 | B2 | * | 7/2003 | Morizane | 141/61 |
| 6,718,996 | B2 | * | 4/2004 | Crook et al. | 137/1 |
| 7,029,786 | B2 | * | 4/2006 | Campau | 429/64 |
| 7,049,026 | B2 | * | 5/2006 | Muneret | 429/72 |
| 8,286,676 | B2 | * | 10/2012 | Ianniello | 141/198 |

* cited by examiner

*Primary Examiner* — Gregory Huson
*Assistant Examiner* — Nicolas A Arnett
(74) *Attorney, Agent, or Firm* — Rabin & Berdo, P.C.

(57) ABSTRACT

An automatic acid filling apparatus includes a base with at least one acid filling tank pivotably connected thereto. The filling tank has an opening and a gate respectively connected to each end thereof. A first activating device is pivotably connected to the base and the acid filling tank, and a second activating device is pivotably connected to the acid filling tank. The second activating device controls the gate to be opened so that the assembled horizontal batteries can be placed into the acid filling tank. The gate is then closed. A suction device sucks air out of the acid filling tank from the opening, and then the acid is filled into the acid filling tank via the opening by using an acid filling device. The first activating device activates the acid filling tank to rotate to an inclined position for fully absorbing the acid.

3 Claims, 6 Drawing Sheets

AUTOMATIC ACID FILLING APPARATUS

BACKGROUND OF THE INVENTION

1. Field of the Invention

The present invention relates to an apparatus for automatically and quickly filling the horizontal batteries with acid.

2. The Prior Arts

The conventional sealed lead-acid batteries have the following shortcomings:
(1) The grid is made by pouring molten lead ingots into a mold, and however, the material consumption is relatively high by using this process.
(2) If the electrode plates are vertically arranged, the electrolyte stratification will occur.
(3) The electrode plates are secured in place by the fixing rods disposed on the two sides of the electrolysis tank, and however, the active substances of the electrode plates easily drop off due to impact and vibration.
(4) The manufacturing processes involve repeatedly drying and maturing steps so that it requires a longer period to complete the processes, and the longer period delays the capital flow and increases the waiting period of the products in the market.
(5) The grid is made of solid lead alloy, and the lead ingots for the proper series and/or parallel connections of the electrodes are required, and thereby material consumption is relatively high.
(6) Lead vapor is released in the process of melting lead ingots, which can pollute the environment when ventilation is not adequate.
(7) The ratio of the energy output of a battery to its weight (33 wh/kg) is low, and the battery cycle life is only about 300 cycles due to the anti-vibration structure of the battery, and the battery charge time is too long which requires about 6 to 8 hours.

The horizontal lead-acid batteries are developed for improving the shortcomings of the conventional vertical batteries. Strings of glass fiber are wrapped into a core of a horizontally lead-acid battery, and a layer of lead alloy is coated on the outside of the core by cold extrusion to form a lead string. The lead strings are then woven into a lead grid. A new lead paste is produced without the maturity stage, and the positive electrode and the negative electrode lead pastes are respectively coated on the lead grid according to the desired battery structure. In order to secure the active substances on the electrode plates, a sheet of specific paper is attached to the two sides of the electrode plate, and then dried and wrapped with the specific fine glass cottons, and then the electrode plates are assembled and used in a lead acid battery. The lead acid battery is then sealed, followed by filling acid, forming, filling curing agent, cleaning and packing. After that, the process for manufacturing the horizontal lead acid battery is completed.

Because the electrode plates are horizontally arranged, the concentration polarization, which is due to the concentration difference which develop at the anode and cathode during electrolysis, can be eliminated, and the concentration polarization is one of the main reasons why the capacity and the lifetime of the batteries are reduced.

The internal resistance of the horizontal lead acid batteries is small because the positive and negative electrodes are directly in contact with each other so that the active substance can be used uniformly. The lead ingots used for connecting batteries in parallel are saved. The high current electrical discharge and voltage drop become small.

The lead net replaces the conventional grid so that the weight of the batteries is reduced, and the material consumption is relatively low. The ratio of the energy output of a battery to its weight (40 wh/kg) is greatly increased, and the charge acceptance of lead acid battery is increased so that the charging time is shortened.

Because the lead net has good tensile strength, the active substances on the electrode plates can allow large strain deformation, and thereby the battery cycle life is increased.

Because the Lead net has better structural strength and bears the deformation of the active substances on the electrode boards, the times of circulation are increased.

In the conventional acid filling process, the acid is filled into the battery case after the electrode plates and other associated parts have been assembled together therein. An electrochemical reaction is carried out by bringing an electrolyte which comprises acid into electrically conductive contact with the electrodes, which generate electric power. Conventionally, the batteries are placed on the support frame one by one, and then the support frame is placed into a large-sized acid filling tank. This acid filling tank is closed, and then the acid is filled into the acid filling tank so that the batteries are immersed into the acid for a period of time. The support frame and the batteries are then taken out from the acid filling tank, and the batteries are dried, and are ready for the next process. However, the batteries have to be placed on and removed from the support frame one by one manually during the acid filling process, and thereby the acid filling efficiency is low.

SUMMARY OF THE INVENTION

A primary objective of the present invention is to provide an automatic acid filling apparatus to improve the low efficiency of the conventional acid filling processes.

The present invention provides a plurality of small-sized acid filling tanks of which space allows only one battery, and each of the acid filling tanks is used together with a suction device and an acid filling device. The acid filling tanks can be individually rotated to an inclined position to allow the battery therein to fully absorb the acid, and then the batteries can be individually taken out from the acid filling tank. Therefore, the acid-filling efficiency is increased.

The automatic acid filling apparatus of the present invention comprises a base; at least one acid filling tank which is pivotably connected to the base and has a first end and a second end, wherein an opening is located at the first end, and a gate is movably connected to the second end; at least one first activating device which has two ends, wherein these two ends are respectively pivotably connected to the base and the acid filling tank, and the at least one first activating device activates the acid filling tank to be rotated relative to the base; at least one second activating device which is connected to the acid filling tank, wherein the gate is pivotably connected to the second activating device, and the second activating device activates the gate to be opened or closed relative to the acid filling tank; a suction device which sucks air out of the acid filling tank via the opening; and an acid filling device which fills the acid filling tank with acid via the opening.

The at least one first activating device for controlling the acid filling tank is a pneumatic cylinder or a hydraulic cylinder.

The at least one second activating device for controlling the gate of the acid filling tank is a pneumatic cylinder or a hydraulic cylinder.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
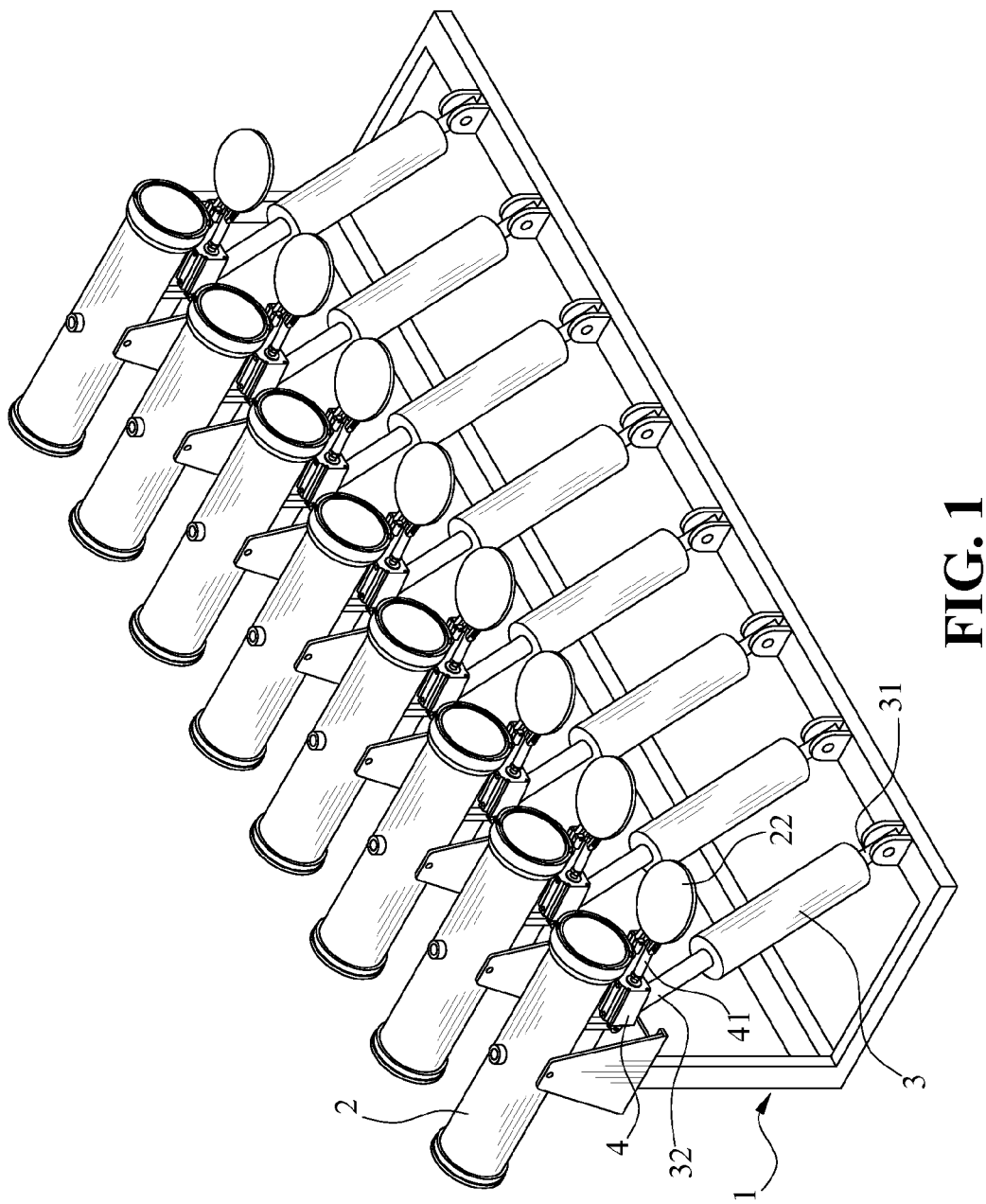
FIG. 1 is a perspective view showing the automatic acid filling apparatus in accordance with the present invention.

With reference to the drawings and in particular to FIG. 1, in the automatic acid filling apparatus of the present invention, a base 1, and a plurality of acid filling tanks 2 which are pivotably connected to the base 1 and arranged in a row are provided. These acid filling tanks 2 are rotatable relative to the base 1. A plurality of first activating devices 3 each having a first end 31 and a second end 32 are also provided wherein the first end 31 is pivotably connected to the bottom of the base 1, and the second end 32 is pivotably connected to the acid filling tank 2. The first activating device 3 activates the acid filling tank 2 to be rotated relative to the base 1. The first activating device 3 can be a pneumatic cylinder or a hydraulic cylinder. The first end 31 is the body of the pneumatic cylinder or the hydraulic cylinder, and the second end 32 is the shaft of the pneumatic cylinder or the hydraulic cylinder. The acid filling tank 2 has two ends wherein an opening 21 is arranged at a first end of the acid filling tank 2, and a gate 22 is movably connected to a second end of the acid filling tank 2 using a pivot or a cantilever arm. A plurality of second activating devices 4 are also provided, and each of the second activating devices 4 is fixed to the outside of its corresponding acid filling tank 2, and the movable member 41 of the second activating device 4 is pivotably connected to the gate 22. The movable member 41 of second activating device 4 can control the gate 22 to be opened or closed relative to the acid filling tank 2. In this embodiment, the second activating device 4 is a pneumatic cylinder or a hydraulic cylinder. The shaft of the pneumatic cylinder or the hydraulic cylinder is pivotably connected to the gate 22. A plurality of suction devices 6 and a plurality of acid filling devices 7 are also provided in this embodiment.

Figure 2:
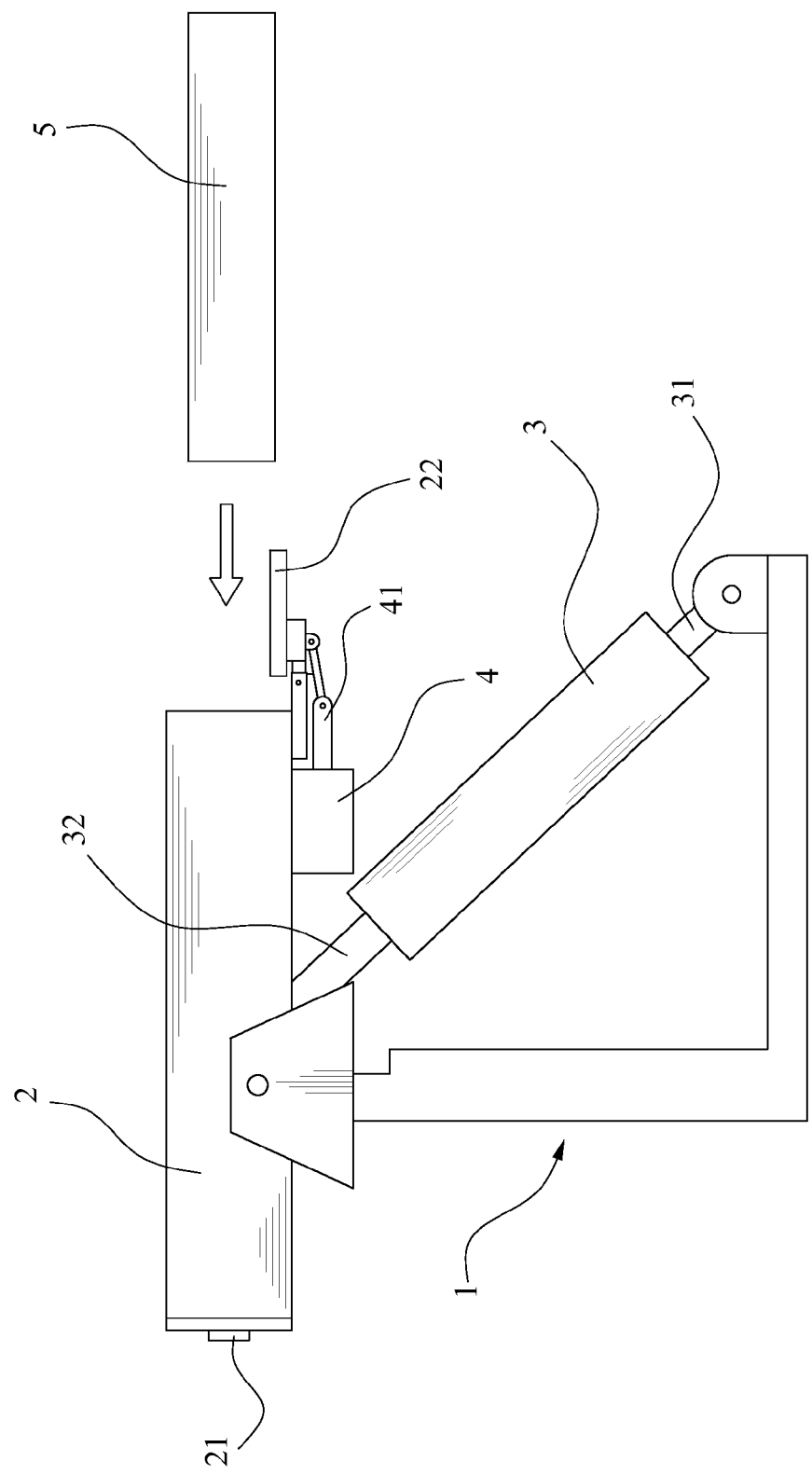
FIG. 2 shows that the gate is opened by the second activating device, and the battery is pushed into the acid filling tank.
Figure 3:
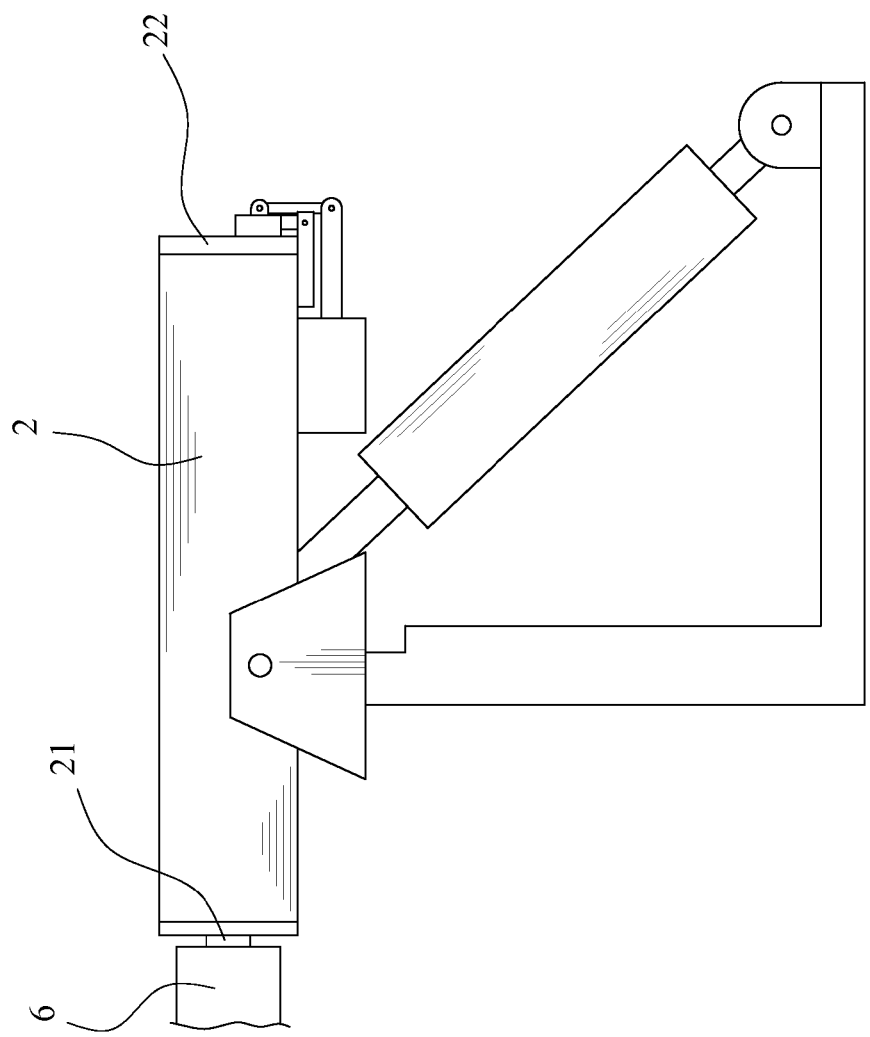
FIG. 3 shows that the acid filling tank with the battery received therein is evacuated by the suction device.
Figure 4:
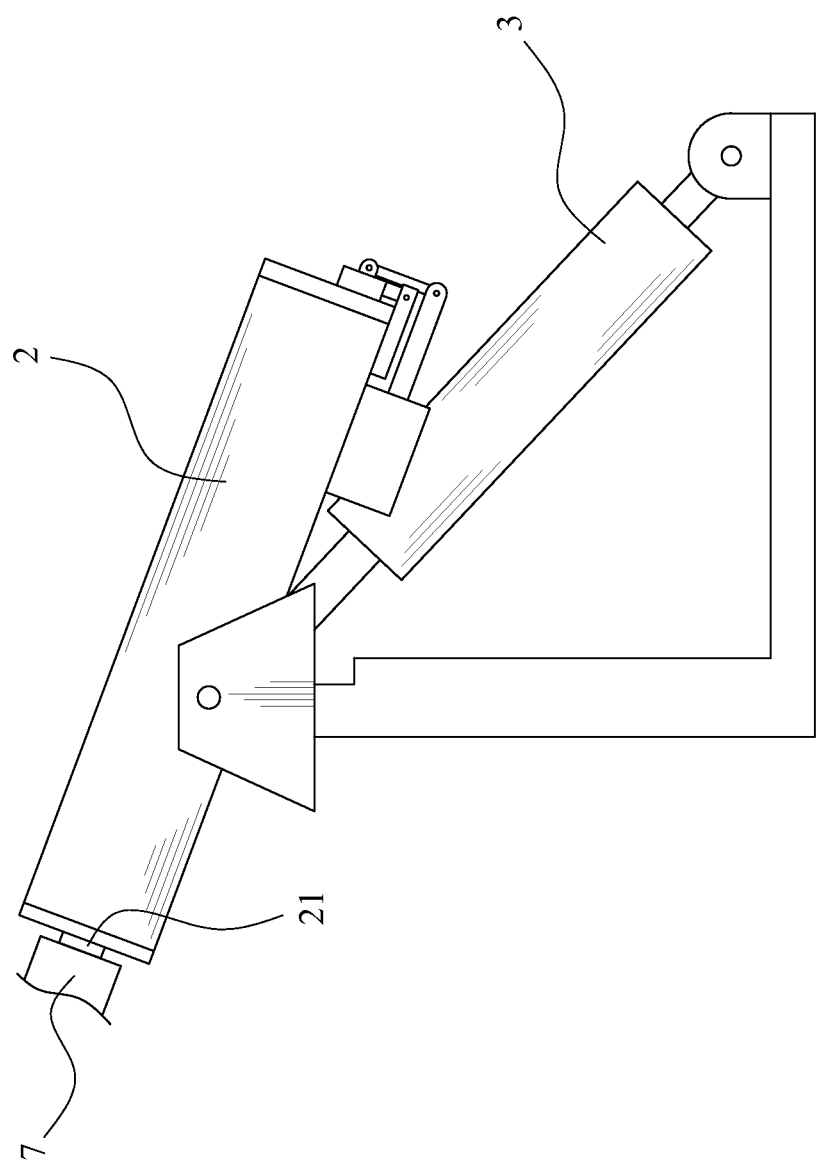
FIG. 4 shows that the evacuated acid filling tank is filled with acid.
Figure 5:
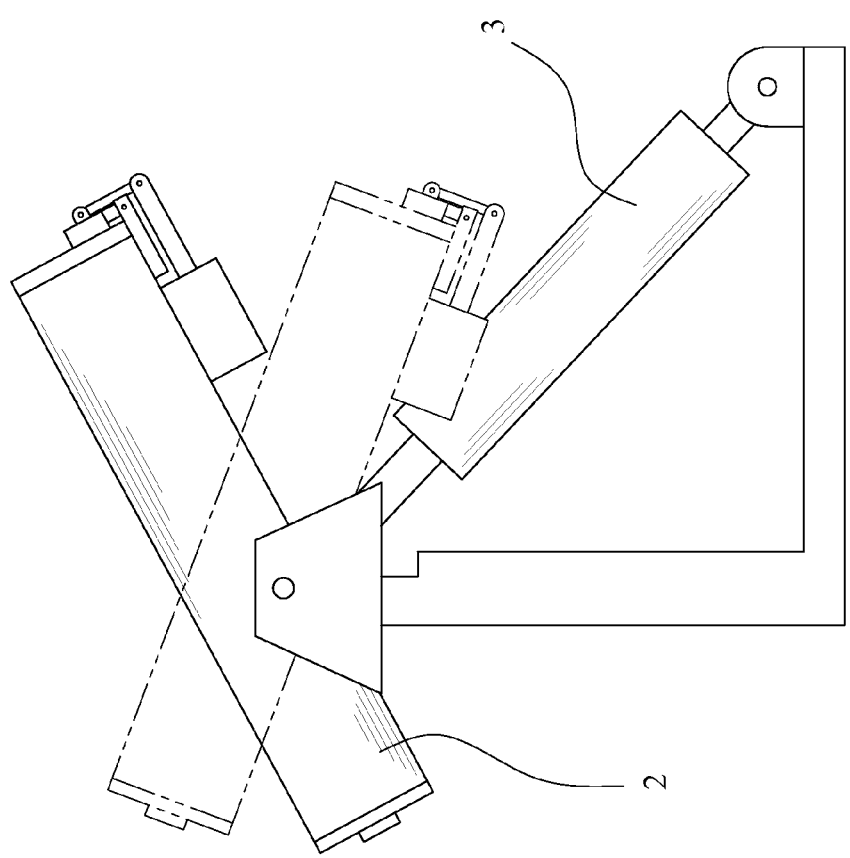
FIG. 5 shows that the acid filling tank is rotated to an inclined position by the first activating device in order to fully absorb the acid.
Figure 6:
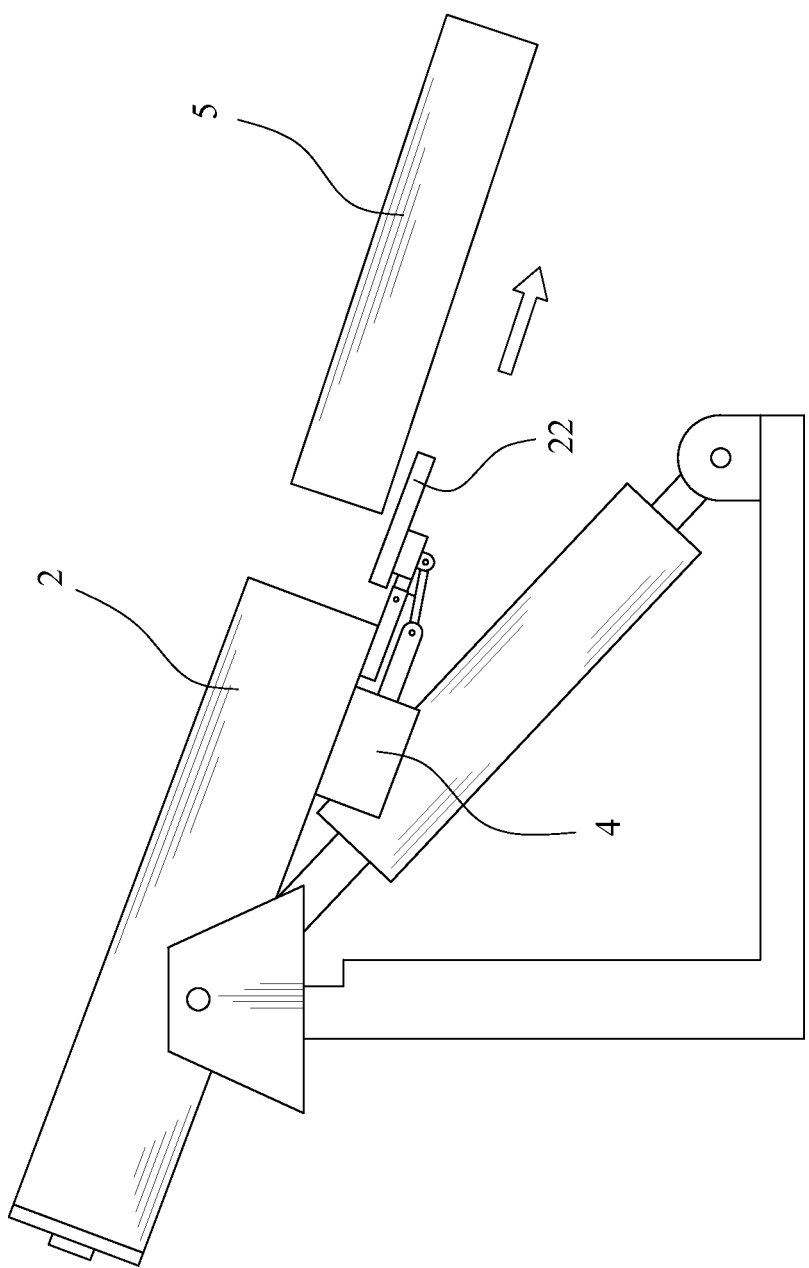
FIG. 6 shows that the acid filling tank is rotated to another inclined position by the first activating device after the acid filling process is completed so as to allow the battery to be taken out from the acid filling tank.

As shown in FIG. 2, in the acid filling process, the second activating device 4 controls the gate 22 to be opened, and then a battery is pushed into the acid filling tank 2 by a transfer device, and the gate 22 is then closed by using the second activating device 4. The suction device 6 then sucks the air out of the acid filling tank 2 via the opening 21 as shown in FIG. 3 so that the interior of the acid filling tank 2 is in vacuum state. The acid is then filled into the acid filling tank 2 via the opening 21 using the acid filling device 7 as shown in FIG. 4. After the acid filling device 7 is removed from the opening 21, the first activating device 3 activates the acid filling tank 2 to cause it to rotate to an inclined position as shown in FIG. 5, and the acid will be fully absorbed by the battery in the inside of the acid filling tank 2 over a period of time. The first activating device 3 then activates the acid filling tank 2 to cause it to rotate to an another inclined position so that the acid can be released from the opening 21 of the acid filling tank 2 to the acid filling device 7, and then the first activating device 3 activates the acid filling tank 2 to cause it to rotate back to its original position. The gate 22 is opened by the second activating device 4 to allow the battery 5 to be taken out from the acid filling tank 2 as shown in FIG. 6, and thereafter the acid-filled battery is moved to the next processing site.

The present invention provides a plurality of small-sized acid filling tanks 2 of which space allows only one battery, and each of the acid filling tanks 2 is used together with a suction device 6 and an acid filling device 7. The acid filling tanks 2 can be individually rotated to an inclined position to allow the battery 5 therein to fully absorb the acid, and then the batteries 5 can be individually taken out from the acid filling tank 2. Therefore, the acid-filling efficiency is increased.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An automatic acid filling apparatus, comprising
   a base;
   at least one acid filling tank being pivotably connected to the base and having a first end and a second end, an opening being located at the first end, a gate being movably connected to the second end;
   at least one first activating device having two ends, the two ends being respectively pivotably connected to the base and the acid filling tank, the at least one first activating device activating the acid filling tank to be rotated relative to the base;
   at least one second activating device connected to the acid filling tank, the gate being pivotably connected to the second activating device, the second activating device activating the gate to be opened or closed relative to the acid filling tank;
   a suction device sucking air out of the acid filling tank via the opening; and
   an acid filling device filling the acid filling tank with acid via the opening.

2. The apparatus as claimed in claim 1, wherein the at least one first activating device is a pneumatic cylinder or a hydraulic cylinder.

3. The apparatus as claimed in claim 1, wherein the at least one second activating device is a pneumatic cylinder or a hydraulic cylinder.

* * * * *